United States Patent [19]

Singh et al.

[11] Patent Number: 4,538,446

[45] Date of Patent: Sep. 3, 1985

[54] TECHNIQUE FOR MEASURING GAS CONVERSION FACTORS

[75] Inventors: Jag J. Singh, Yorktown; Danny R. Sprinkle, Newport News, both of Va.

[73] Assignee: The United States of America as represented by the Administrator of the National Aeronautics and Space Administration, Washington, D.C.

[21] Appl. No.: 633,179

[22] Filed: Jul. 23, 1984

[51] Int. Cl.$^3$ .......................... G01F 1/70; G01F 25/00
[52] U.S. Cl. ........................................ 73/3; 73/861.07
[58] Field of Search ..................... 73/861.04, 861.07, 3

[56] References Cited

U.S. PATENT DOCUMENTS 4,055,083 10/1977 Haas .............................. 73/861.07 X
4,341,107 7/1982 Blair et al. ................................. 73/3

Primary Examiner—Herbert Goldstein
Attorney, Agent, or Firm—Howard J. Osborn; John R. Manning; William H. King

[57] ABSTRACT

A method for determining hydrocarbon conversion factors for a flowmeter 17. A mixture of air, $O_2$ and $C_xH_y$ is burned and the partial pressure of $O_2$ in the resulting gas is forced to equal the partial pressure of $O_2$ in air. The flowrate of $O_2$ flowing into the mixture is measured by flowmeter 13 and the flowrate of $C_xH_y$ flowing into the mixture is measured by the flowmeter 17 conversion factor is to be determined. These measured values are used to calculate the conversion factor.

6 Claims, 1 Drawing Figure

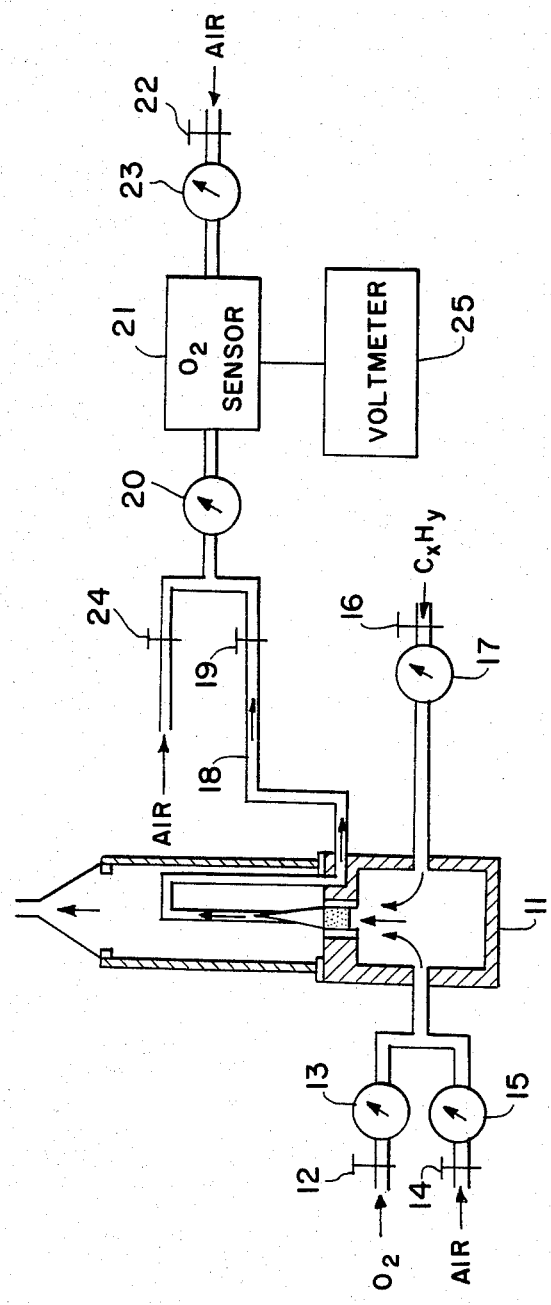

TECHNIQUE FOR MEASURING GAS CONVERSION FACTORS

ORIGIN OF THE INVENTION

The invention described herein was made by employees of the U.S. Government and may be manufactured and used by the Government for governmental purposes without the payment of any royalties thereon or therefor.

BACKGROUND OF THE INVENTION

The invention relates generally to gas flowmeters and more specifically concerns calibrating hydrocarbon gas flowmeters.

Gas flowmeters are widely used in various scientific and industrial applications. Their efficient use requires frequent calibrations. Such routine calibrations are generally easy except when the gases involved are rare/toxic or highly reactive. Most of the hydrocarbons, however, fall in the latter category and often call for special calibration equipment and procedures.

Flowmetry of gaseous hydrocarbons has always been a challenging problem. Normally, the flowmeters used for hydrocarbons are calibrated for air and require a special calibration factor for each hydrocarbon, depending on the physical principle involved in the operation of the flowmeter.

There are many types of flowmeters in use today. These include among others turbine flowmeters, variable area flowmeters, head type flowmeters, ultrasonic mass flowmeters and thermal flowmeters. All flowmeters are normally calibrated for air and then used for other gases with the help of conversion/correction factors provided by the manufacturer. For thermal flowmeters, these conversion factors F are calculated by dividing the specific heat $C_P$ of air at standard temperature and pressure (STP) by the specific heat $C_P$ of the test gas at STP. However, experimentally determined values of F are not always in agreement with the calculated values, mainly because $C_P$ values for most hydrocarbons vary significantly with temperature and pressure and are not constant across the test element. For this reason, it is always advisable to use experimentally determined values of F—particularly in high accuracy investigations. This, however, is not always feasible—particularly when the gases are toxic or rare. Hydrocarbons which are widely used in aeronautical and/or combustion kinetics laboratories fall in the group of gases for which calibration is not routinely performed. More often than not, one has to contend with the calculated values of the gas conversion factors which suffer from their inherent inaccuracies for the reasons cited above.

It is an object of the invention to provide a technique for obtaining the gas conversion factors for flowmeters.

Another object of this invention is to provide a technique for experimentally obtaining hydrocarbon gas conversion factors for flowmeters.

A further object of this invention is to provide a technique for obtaining the toxic or rare gas conversion factors for flowmeters.

Other objects and advantages of this invention will become apparent hereinafter in the specification and drawing.

SUMMARY OF THE INVENTION

This invention is a method of obtaining the hydrocarbon $C_xH_y$ conversion factor F for a flowmeter. A mixture of air, $O_2$ and $C_xH_y$ is formed in a combustion chamber where the mixture is burned to produce a product gas. $O_2$ flows into the mixture at a flow rate of m and $C_xH_y$ flows into the mixture at a flow rate of n. The partial pressure of $O_2$ in the product gas is compared with the partial pressure of $O_2$ in air. The flow rate of $C_xH_y$ into the mixture is measured by the flowmeter whose conversion factor is to be determined. The flow rate of $O_2$ into the mixture is changed until the partial pressure of $O_2$ in the product gas is equal to the partial pressure of $O_2$ in the air. Then $$F = \frac{O_2 \text{ flow rate}}{(m/n) \text{ reading on the dial of the } C_xH_y \text{ flowmeter}}$$

where m/n is calculated in the product gas for the hydrocarbon $C_xH_y$ with the assumption that the mole fraction of oxygen in the product gas is the same as in air.

BRIEF DESCRIPTION OF THE DRAWING

The drawing is apparatus suitable for performing the method of this invention.

DETAILED DESCRIPTION OF THE INVENTION

Turning now to the embodiment of the apparatus selected to demonstrate the invention, the number 11 in the FIG. is a burner. Oxygen under pressure is passed into burner 11 through a valve 12 and a flowmeter 13. Air under pressure is passed into burner 11 through a valve 14, and a flowmeter 15, and a hydrocarbon $C_xH_y$ under pressure is passed into burner 11 through a valve 16 and a flowmeter 17. The purpose of the method of this invention is to experimentally determine the conversion factor F of flowmeter 17 for the hydrocarbon $C_xH_y$.

The essential chemistry of the hydrocarbon combustion process in oxygen-enriched air inside burner 11 is represented by the following equation:

$$[l(\text{Air}) + m(O_2) + n(C_xH_y)] \longrightarrow \quad (1)$$

Input Channel $$\begin{bmatrix} l(\text{Air}) + nx(CO_2) + \\ \frac{n}{2} y(H_2O) + \left(m - n\left(\frac{4x+y}{4}\right)\right)(O_2) + \\ \text{Heat} \end{bmatrix}$$

Output Channel

The mole fraction of oxygen in the output channel of equation (1) is given by the following equation:

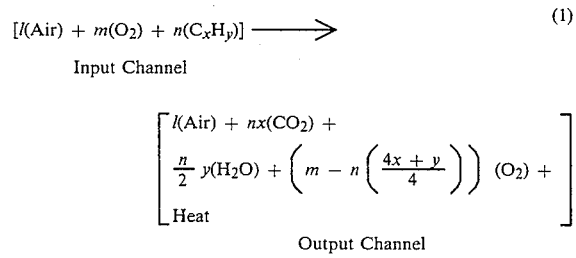

If the mole fraction of oxygen in the output channel is the same as in the reference gas (air), we obtain:

$$0.2095 = \frac{0.2095 l + \left[ m - n \left( \frac{4x+y}{4} \right) \right]}{l + nx + \frac{n}{2} y + \left[ m - n \left( \frac{4x+y}{4} \right) \right]} \quad (3)$$

Simplifying equation (3), we obtain:

$$\frac{m}{n} = \frac{4x + 1.2095 \, y}{4(1 - 0.2095)} \quad (4)$$

For the special case of $C_xH_y \equiv CH_4$, equation (4) simplifies as follows:

$$\frac{m}{n} = 2.795 \quad (5)$$

Calculated values of m/n for other hydrocarbons are: ethane, $C_2H_6$, 4.825; propane, $C_3H_8$, 6.855; butane, $C_4H_{10}$, 8.885; pentane, $C_5H_{12}$, 10.915; hexane, $C_6H_{14}$, 12.945; heptane, $C_7H_{16}$, 14.975; octane, $C_8H_{18}$, 17.005; nonane, $C_9H_{20}$, 19.035; and decane, $C_{10}H_{22}$, 21.065. It is apparent from equation (4) that m/n is independent of the value of l, though the latter does determine the sustainability of the hydrocarbon flame. Optimum value of l ranges from 2 m to 3 m.

The product of the combustion in burner 11 (the output channel side of equation (1) is passed through a tube 18, a valve 19, and a flowmeter 20 to one side of an $O_2$ sensor 21. Reference air under pressure is passed through a valve 22 and a flowmeter 23 to the other side of $O_2$ sensor 21. Calibration air under pressure is passed through a valve 24 and the flowmeter 20 to the first side of sensor 21. A voltmeter 25 measures the output of sensor 21.

$O_2$ sensor 21 is a $ZrO_2$ oxygen sensor. The sensor is made of a high temperature, $Y_2O_3$-stabilized $ZrO_2$ ceramic electrolyte disc coated with porous platinum electrodes on both sides. The platinum electrodes are porous enough to permit ready diffusion of gases through them. Whenever gases containing oxygen are applied to the two sides of the sensor the relationship between sensor voltage output E and the oxygen partial pressures $P_1$ and $P_2$ on the two sides is given by the following equation:

$$E = AT \ln \left( \frac{P_1}{P_2} \right) + C(P) \quad (6)$$

where A is a mathematical constant, T is the $ZrO_2$ disc temperature and C(P) is the cell constant which can be determined by calibration with known gas mixtures at known pressures. If the partial pressures on the two sides of the sensors are equal, that is $P_1 = P_2$, then the output E of the sensor is equal to C(P).

In utilizing the technique of this invention with the apparatus shown in the drawing, valve 19 is closed and valves 22 and 24 are adjusted to make the readings on flowmeters 20 and 23 the same. Then the voltage registered on voltmeter 25 is read. The reading on voltmeter 25 is the cell constant C(P) for the $O_2$ sensor 21. Valve 24 is then closed and valves 12, 14 and 16 are opened to allow Air, $O_2$ and $C_xH_y$ to pass into burner 11. The product gases from the combustion in burner 11 are passed through tube 18, valve 19 which is now open and flowmeter 20 to $O_2$ sensor 21. Valves 12, 14, 16 and 19 are then adjusted until the reading on voltmeter 25 is C(P) indicating that the partial pressures of the combustion product gas and air are the same. At this time, the conversion factor F for flowmeter 17 can be computed using the following equation:

$$F = \frac{O_2 \text{ flowrate}}{\left( \frac{m}{n} \right)_{C_xH_y} C_xH_y \text{ flowrate on flowmeter 17}} \quad (7)$$

The $O_2$ flowrate is computed by multiplying the reading on the dial of flowmeter 13 by the oxygen conversion factor for flowmeter 13. Oxygen conversion factors are usually supplied by the flowmeter manufacturers because of the widespread use of oxygen in chemistry/combustion laboratories.

Typical results obtained with selected hydrocarbon gases are summarized in Table I and Table II. The last columns in these tables list the values of the conversion/correction factors expected if the test gases were at STP during their transport through the heated element of the flowmeter. However, the temperature and pressure of the test gases through the heated element are not standard and their values are not easily measurable. This makes the calculated conversion/correction factor values suspect, thereby necessitating their experimental determination for all hydrocarbons and other gases whose $C_P$ values vary significantly with temperature and pressure.

TABLE I

Summary of Conversion Factor Measurements for Selected Saturated Hydrocarbons

| Air-Flowrate (l) cm³/min | $O_2$-Flowrate (m) cm³/min | Hydrocarbon Flowrate cm³/min (Dial Reading) | Sampled Flowrate (Air Equivalent) cm³/min | Gas Conversion Factor (F) (Experimental) | Gas Conversion Factor (F) (Calculated)* |
|---|---|---|---|---|---|
| Methane $CH_4$ | | | | | |
| 1400 | 391.1 | 200 | 1300 | 0.701 | (0.815)* |
| 1400 | 427.8 | 220 | 1300 | 0.699 | |
| 1400 | 469.0 | 240 | 1300 | 0.696 | (0.69)+ |
| | | | | 0.699 ± 0.020 | |
| Ethane $C_2H_6$ | | | | | |
| 1700 | 679.0 | 307 | 2000 | 0.458 | (0.56)* |
| 1700 | 727.5 | 329/330 | 2000 | 0.459 | |
| 1700 | 776.0 | 351 | 2000 | 0.458 | |
| 1700 | 824.5 | 372 | 2000 | 0.459 | |
| 1700 | 873.0 | 392/393 | 2000 | 0.461 | |

TABLE I-continued

Summary of Conversion Factor Measurements for Selected Saturated Hydrocarbons

| Air-Flowrate (l) cm³/min | O₂-Flowrate (m) cm³/min | Hydrocarbon Flowrate cm³/min (Dial Reading) | Sampled Flowrate (Air Equivalent) cm³/min | Gas Conversion Factor (F) (Experimental) | Gas Conversion Factor (F) (Calculated)* |
|---|---|---|---|---|---|
| Propane C₃H₈ | | | | 0.459 ± 0.020 | |
| 1700 | 679.0 | 312 | 2000 | 0.317 | (0.394)* |
| 1700 | 727.5 | 334 | 2000 | 0.318 | |
| 1700 | 776.0 | 356 | 2000 | 0.318 | (0.32)⁺ |
| 1700 | 824.5 | 377 | 2000 | 0.320 | |
| | | | | 0.318 ± 0.020 | |
| Butane C₄H₁₀ | | | | | |
| 1700 | 679.0 | 303/304 | 2000 | 0.252 | (0.30)* |
| 1700 | 727.5 | 324 | 2000 | 0.253 | |
| 1700 | 776.0 | 346 | 2000 | 0.252 | |
| 1700 | 824.5 | 365 | 2000 | 0.254 | |
| | | | | 0.253 ± 020 | |

TABLE II

Summary of Conversion Factor Measurements for Acetylene, C₂H₂

| Air-Flowrate (l) cm³/min | O₂-Flowrate (m) cm³/min | Hydrocarbon Flowrate cm³/min (Dial Reading) | Sampled Flowrate (Air Equivalent) cm³/min | Gas Conversion Factor (F) (Experimental) | Gas Conversion Factor (F) (Calculated)* |
|---|---|---|---|---|---|
| 1400 | 426.8 | 200 | 1300 | 0.648 | (0.656)* |
| 1400 | 471.4 | 220 | 1300 | 0.650 | |
| 1400 | 508.3 | 240 | 1300 | 0.643 | (0.67)⁺ |
| | | | | 0.647 ± 0.020 | |

*The Calculated Value is given by: $F = \dfrac{C_P(\text{Air}) \text{ at STP}}{C_P(\text{Test Gas}) \text{ at STP}}$ ⁺The empirical value has been taken from Instruction Manual for Hastings Thermal Mass Flowmeters. Teledyne Hastings Raydists Company, 1979.

The new technique of this invention for calibrating hydrocarbon flowmeters is attractive for the following reasons: It requires very low flow rates, thus causing minimal loss of the rare gas samples; it is self-regulating, thus minimizing the risk of release of unburnt toxic species into the laboratory environment; it is independent of the operating principle of the flowmeter, i.e., it provides an independent measure of the true flow rates of the hydrocarbons under study; it lends itself to easy and convenient incorporation into standard laboratory calibration procedures; and it has the potential of providing information about non-combustible impurities that might be present in the test stream.

The technique has been used to calibrate thermal mass flowmeters for a number of hydrocarbons. In those instances where directly measured "empirical" values of the calibration factors are available, the present values are in reasonable agreement with them.

What is claimed is:

1. A method for obtaining the hydrocarbon $C_xH_y$ conversion factor for a flowmeter comprising the steps of:
    forming a mixture of air, $O_2$ and $C_xH_y$ with $O_2$ flowing into the mixture at a flowrate of m and with $C_xH_y$ flowing into the mixture at a flowrate of n;
    burning said mixture to form a product gas;
    comparing the partial pressure of $O_2$ in the product gas with the partial pressure of $O_2$ in air;
    measuring the flowrate of the $C_xH_y$ flowing into said mixtures with said flowmeter; and
    changing the flowrate of $O_2$ flowing into said mixture until said comparing step indicates that the partial pressures of $O_2$ in the product gas and air are equal;
    whereby the reading on the dial of said flowmeter can be used for calculation of the conversion factor of said flow meter for the hydrocarbon $C_xH_y$.

2. A method according to claim 1 including the computing step of multiplying the reading on the dial of said flowmeter by m/n for the hydrocarbon $C_xH_y$ with the assumption that the mole fraction of oxygen in the product gas is the same as in air and dividing the product into the flowrate of $O_2$ into said mixture.

3. A method according to claim 2 including the step of computing m/n in the product gas for the hydrocarbon $C_xH_y$.

4. A method according to claim 1 wherein the flowrate of air into said mixture is two to three times the flowrate of the $O_2$ into the mixture.

5. A method according to claim 1 wherein said step of comparing the partial pressure of $O_2$ in the product gas with the partial pressure of $O_2$ in air comprises the step of comparing the partial pressure of $O_2$ in calibration air with the partial pressure of $O_2$ in reference air to obtain an output C(P) equal to the cell constant of the comparing means used and then comparing the partial pressure of $O_2$ in the product gas with the partial pressure of $O_2$ in reference air to obtain an output C(P).

6. A method for obtaining the conversion factor of a flowmeter when measuring the flowrate of a gas $M_xN_y$ comprising the steps of:
    forming a mixture of air, $O_2$ with $M_xN_y$ with $O_2$ flowing into the mixture at a flowrate of m and with $M_xN_y$ flowing into the mixture at a flow rate of n;
    burning said mixture to form a product gas;
    comparing the partial pressure of $O_2$ in the product gas with the partial pressure of $O_2$ in air;
    measuring the flowrate of $M_xN_y$ flowing into said mixture with said flowmeter; and
    changing the flowrate of $O_2$ flowing into said mixture until said comparing step indicates that the partial pressures of $O_2$ in the product gas and air are equal;
    whereby the reading on the dial of said flowmeter, m/n of the test gas and the flowrate of $O_2$ into the mixture can be used for the calculation of the conversion factor of the flowmeter.

* * * * *